United States Patent [19]

Steelman et al.

[11] Patent Number: 5,328,512
[45] Date of Patent: Jul. 12, 1994

[54] CHAMBERED SPRAY-APPLICATION SYSTEM

[75] Inventors: Michael L. Steelman, Madison; William J. Taylor, Huntsville, both of Ala.

[73] Assignee: The United States of America as represented by the Secretary of the Army, Washington, D.C.

[21] Appl. No.: 920,705

[22] Filed: Jul. 27, 1992

[51] Int. Cl.5 .............................................. B05B 12/00
[52] U.S. Cl. .................................. 118/674; 118/697; 118/325; 118/326; 156/169; 385/123
[58] Field of Search ............... 118/663, 674, 696, 697, 118/698, 710, 325, 326, 420; 427/163, 434.7, 177; 156/166, 169, 172; 89/1.34; 244/3.12; 385/123, 128, 137, 147

[56] References Cited

U.S. PATENT DOCUMENTS

| | | | |
|---|---|---|---|
| 3,111,440 | 11/1963 | Prentice | 118/325 |
| 4,932,990 | 6/1990 | Michie et al. | 385/123 |
| 4,950,049 | 8/1990 | Darsey et al. | 385/123 |
| 4,955,688 | 9/1990 | Chapin et al. | 385/123 |
| 4,978,413 | 12/1990 | Schotter | 156/169 |
| 5,186,781 | 2/1993 | Verville | 156/169 |
| 5,194,112 | 3/1993 | Allan | 156/172 |
| 5,213,843 | 5/1993 | Working | 118/325 |
| 5,232,738 | 8/1993 | Verville | 427/163 |

*Primary Examiner*—Joseph W. Drodge
*Attorney, Agent, or Firm*—Fred M. Bush; Hay Kyung Chang

[57] ABSTRACT

A sprayer of an elongated shape receives a desired liquid from an outside source and spray-applies the liquid onto a fiber in response to motivating force provided by pressurized gas. The unsprayed, virgin fiber enters the sprayer through an inlet hole, is sprayed on with the liquid as it travels the width of the sprayer and exits the sprayer as a sprayed fiber through an exit hole. The pressure of the motivating gas can be varied to provide the optimum jettisoning force for a selected liquid, taking into consideration the viscosity, volatility and other pertinent characteristics of the liquid.

8 Claims,

CHAMBERED SPRAY-APPLICATION SYSTEM

DEDICATORY CLAUSE

The invention described herein may be manufactured, used, and licensed by or for the Government for governmental purposes without the payment to us of any royalties thereon.

BACKGROUND OF THE INVENTION

In the Fiber Optic Guided Missile (FOG-M) and other Fiber Optic Guided Vehicles (FOG-V'S), the fiber optic dispenser is a critical component. The fiber optic dispenser, once fabricated, must be able to retain its original, wound configuration during the storage period prior to actual use which period can be as long as 10 years. Application of adhesive on the fiber as it is wound onto the bobbin helps keep the fiber in its wound configuration during the storage period and makes subsequent payout smooth.

Current state-of-the-art adhesive application technology used for FOG-M/FOG-V fiber dispenser fabrication includes manual over-spray, squirt stream/flooding, on-line fiber die coating, off-line pre-applied coating and hybrid fiber coating. However, each of these processes has some limitations that affect fabrication parameters, automation capability and subsequent dispenser performance. A few of the major limitations are: inconsistent flow-rate control due to operator dependence and flow irregularity which result in inconsistent adhesive coating on the fiber, requirement for high percentage of solvent dilution for adhesive application and the difficulty of dressing crossover patterns during winding.

SUMMARY OF THE INVENTION

A new means of applying adhesive onto fibers is provided by the chambered spray-application system, featuring an elongated chamber that has inlet and outlet holes on opposite sides and a spray applicator inside. The chamber, being placed between the supply spool of virgin fiber and the bobbin, sprays the adhesive onto the fiber as it enters the chamber through the inlet hole, travels the width of the chamber and exits through the outlet hole on its way to being wound onto the bobbin. The spray applicator is connected to a reservoir which contains the adhesive. From the reservoir, the adhesive is selectively supplied to the applicator to be sprayed onto the fiber. The spray applicator is also connected to a variable pressure source which supplies the sprayer with the force to jettison the adhesive out of the applicator. The chambered spray-application system is susceptible to automation for continuous (on-line) and more even application of adhesive onto fiber as described hereinbelow.

DESCRIPTION OF THE PREFERRED EMBODIMENT

Figure 1:
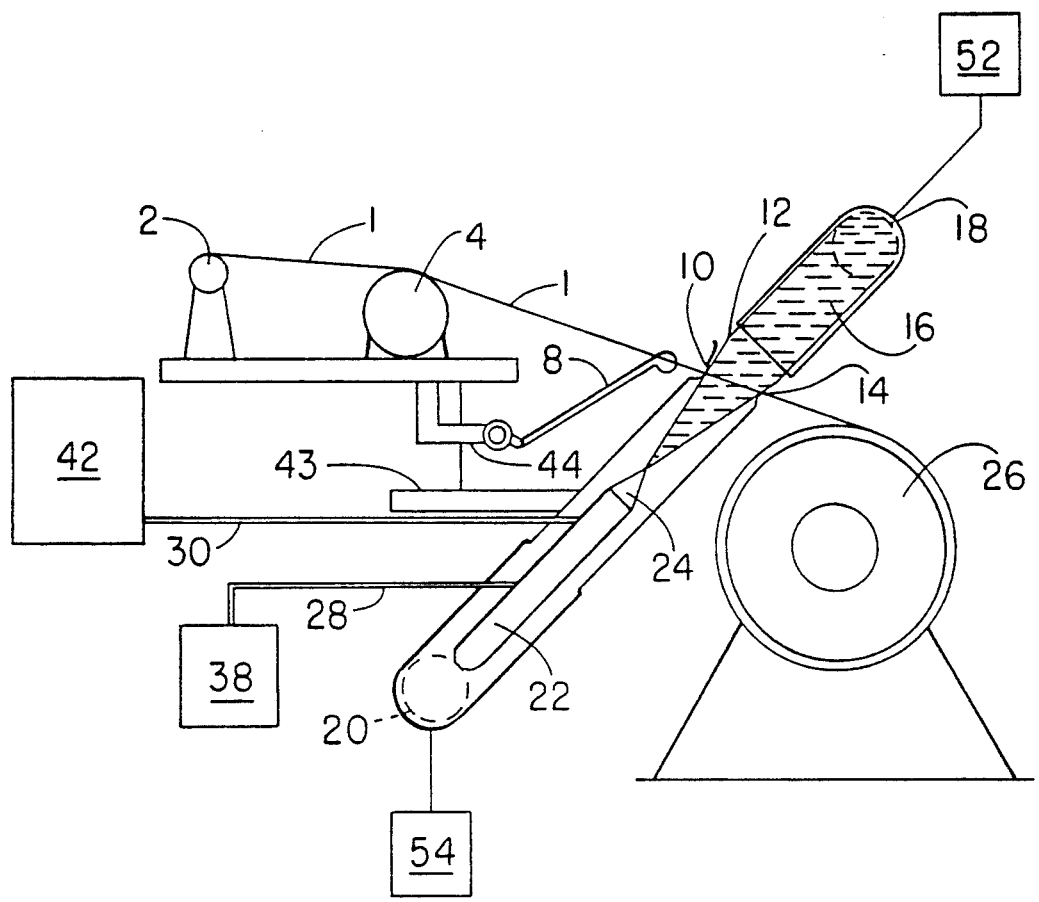
FIG. 1 is a diagram of the chambered spray-application system.

Turning now to the figures wherein like numbers refer to like parts, FIG. 1 shows a diagram of the chambered spray-application system.

During the operation of the system, virgin fiber 1 is released from supply spool 2 and directed by delivery mechanism pulley 4 toward inlet hole 10. Position sensor 44 which has looped pin 8 at one end thereof is placed between delivery mechanism pulley 4 and inlet hole 10 and senses the position of fiber 1 as the fiber traverses through the looped pin. Position adjustor 43 which is appropriately coupled between applicator housing 12 and position sensor 44 causes suitable adjustment in the alignment of the housing in response to the information supplied by position sensor 44 regarding the current position of fiber 1. Such adjustments assure that the fiber proceeds properly into inlet hole 10 on one side of applicator housing 12. While the fiber traverses the width of housing 12 toward outlet hole 14, airbrush 22 having a spray nozzle 24 at one end is activated. When airbrush 22 is activated, a selected liquid such as liquid adhesive or cleaning solvent is sprayed outwardly in a conical fashion 16 from nozzle 24. Some of the sprayed liquid adheres to outer surface of fiber 1 as it passes through the spray and thereby coats the fiber or, in case of a cleaning solvent, removes a previously-sprayed liquid. Excess liquid is collected and disposed of by top exhaust 18 and bottom exhaust 20 which are located at opposite ends of housing 12 and operate by a suitable method such as suction method. Inlet and outlet holes 10 and 14 are diamond-shaped to help direct excess liquid away from the fiber to prevent over-application. In the foregoing process, fiber 1, while traveling between inlet and outlet holes 10 and 14, does not come into contact with anything other than the sprayed liquid; therefore, the fiber is subject to lower risks of damage. Fiber 1, now sprayed with the selected liquid, leaves housing 12 through outlet 14 and is wound onto bobbin 26.

The selected liquid to be sprayed and the pressure to force the liquid out from nozzle 24 are supplied to airbrush 22 by reservoir 42 and variable pressure source 38, respectively, which are suitably linked, independently of each other (i.e. in parallel), to airbrush 22. Suitable linkage is provided by liquid hose 30 and air hose 28, respectively.

Figure 2:
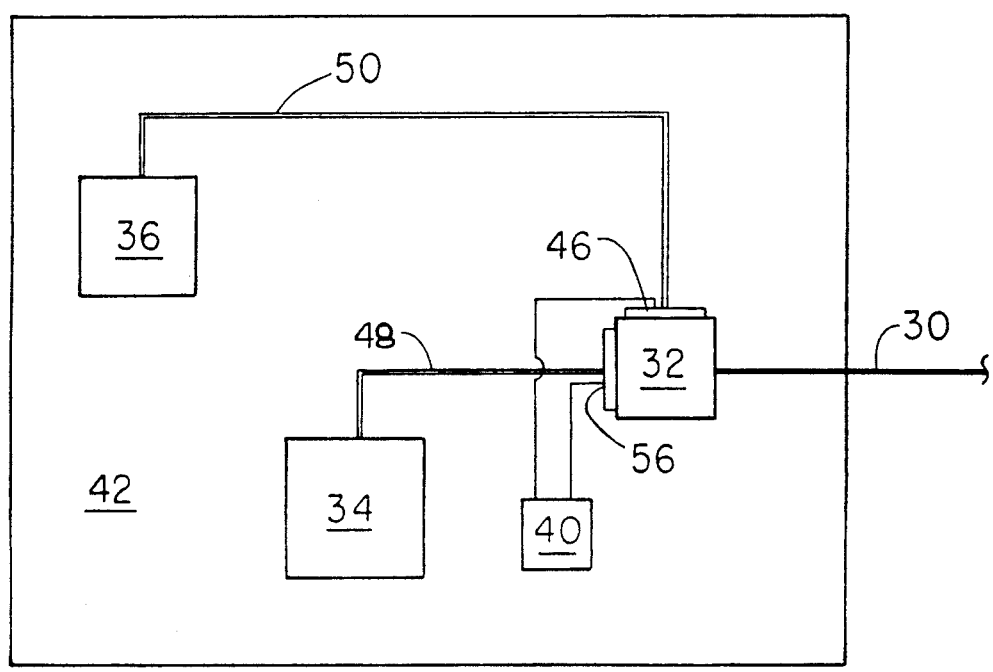
FIG. 2 is a detailed depiction of the reservoir.

As shown in FIG. 2, reservoir 42 is comprised of enclosed cup 32 which has a first valve 56 and a second valve 46, a first tank 34 containing liquid adhesive therein and connected to first valve 56 via hollow tube 48; a second tank 36 containing cleaning solvent and connected to second valve 46 via tube 50 and valve controller 40 which selectively opens and closes the valves.

Figure 3:
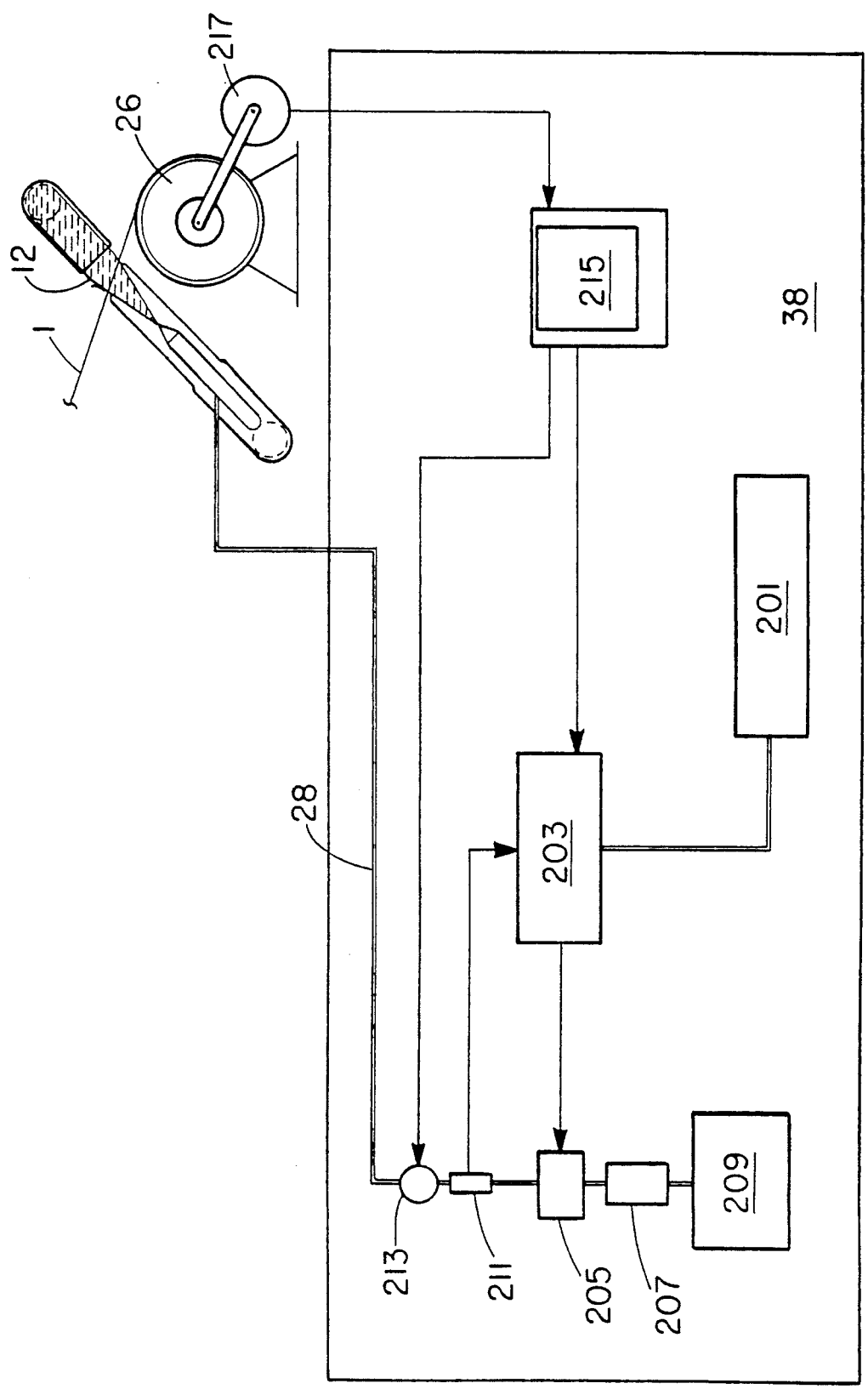
FIG. 3 schematically shows the variable pressure source and automation of the same.

Upon a suitable command from valve controller 40, either first valve 56 or second valve 46 opens but not at the same time. If valve 56 opens, then liquid adhesive from first tank 34 flows through tube 48 into enclosed cup 32 whence it flows further via liquid hose 30 into airbrush 22. The liquid adhesive is then sprayed out of nozzle 24 onto moving fiber 1 in response to gas pressure input to the airbrush from variable pressure source 38. If the winding process must be halted at any given point, then gas flow into airbrush 22 from pressure source 38 is stopped by a suitable method such as shutting cut-off valve 213 appropriately located on gas hose 28 as shown in FIG. 3. If winding reversal is required to correct winding flaws or dress crossovers, then the cut-off valve is opened to allow gas to flow and the direction of travel of fiber 1 through inside of housing 12 is reversed. Valve controller 40, thereupon, closes first valve 56 and opens second valve 46, allowing cleaning solvent from second tank 36 to flow into cup 32 whence it enters airbrush 22 via liquid hose 30. Cleaning solvent is sprayed out of nozzle 24 onto the reversing fiber. A fiber wiper (not shown), suitably mounted between looped pin 8 and inlet hole 10, is activated to wipe any remaining adhesive on the reversing fiber to keep it from contaminating the supply spool and from "gumming" up delivery mechanism pulley 4. When winding of fiber 1 onto bobbin 26 is resumed, the fiber wiper is de-activated and valve controller 40 allows liquid adhesive to flow into airbrush 22 once again.

The above-described spray-application system can spray either volatile or non-volatile liquid adhesives of a wide range of viscosity, while providing uniform, controllable spray.

The uniformity and controllability of the spray is attributable to the high pressure capability of variable pressure source 38 and its susceptibility to precise control of pressure, ranging from 10 pounds per square inch to 1,500 pounds per square inch.

FIG. 3 depicts the details of variable pressure source 38. When pressure source 38 is activated, air at a pressure between 80 psi to 150 psi from shop air supply 201 is input to electropneumatic controller 203 which, in response to the air input, produces an appropriate control signal that is transmitted to variable regulator 205. This signal is used by the regulator to vary the position of its diaphragm to regulate the usually high pressure of nitrogen gas coming into it from nitrogen cylinder 209 before transmitting the nitrogen gas further to airbrush 22 via gas hose 28 to be used as the motivating force for the actual spraying of a selected liquid.

The variable pressure source 38 may, further, be automated, as described hereinbelow, to make the entire spraying process operator-independent and thus less subject to human-induced errors.

Tachometer 217, coupled between bobbin 26 and a suitable computer 215, measures the revolutions-per-minute (RPM) of the bobbin as it rotates and provides the RPM information to the computer. In response to the RPM information, the computer then sends appropriate signals to cut-off valve 213 located at a suitable place along the length of gas hose 28 either to open or shut the valve (for example: if tachometer 217 indicates that bobbin 26 is no longer spinning, then computer 215 will cause the cut-off valve to be shut to prevent continued spraying) and also sends a preset voltage command to electropneumatic controller 203. Transducer 211, which is positioned between variable regulator 205 and cut-off valve 213, measures the actual pressure of nitrogen output of the variable regulator and sends a voltage reading of the pressure to electropneumatic controller 203. The electropneumatic controller then compares this voltage input with the voltage command received from computer 215 and makes an appropriate change in the signal it sends to variable regulator 205, such that the gas pressure ultimately supplied to airbrush 22 provides suitable spraying power for the given speed of bobbin rotation and peculiar characteristics (ex. viscosity, volatility, etc.) of the selected liquid.

Prior to activation of the automated mode of the spray-application system, some preliminary steps should be taken as a matter of prudence. They include calibration of reservoir 42 to set a desired liquid flow rate, alignment of housing 12 with respect to bobbin 26 to ensure that fiber 1 will travel through the center of inlet and outlet holes 10 and 14, adjusting manual regulator 207 of nitrogen cylinder 209 to obtain the maximum desired operating pressure and ascertaining that nozzle 24 and top and bottom exhausts, 18 and 20, respectively, are free of impediments.

Above-described spray-application system can be used to provide a controllable, repeatable, uniform flow of liquid adhesive without adversely affecting wind tension, turn placement, fiber integrity, cross-over dress and other factors that are significant to cable pack stability and payout success.

Although a particular embodiment and form of this invention has been illustrated, it is apparent that various modifications and embodiments of the invention may be made by those skilled in the art without departing from the scope and spirit of the foregoing disclosure. One such variation is in the orientation of the spray applicator. Nozzle 24 may point downwardly or horizontally, provided that the virgin fiber travels through the inside of housing 12 in a correspondingly appropriate position to be sprayed on.

Other possible modifications relate to the exhausts. The exhaust system can be either bidirectional or unidirectional. In the bidirectional mode, as the name implies, each of the top and bottom exhausts has its own source of suction power located in its respective filter tank, 52, 54, whereas in the unidirectional mode, one source of suction power, originating at one exhaust filter tank (usually the bottom one) proceeds across the spray path into the other exhaust. The bidirectional is the preferred mode.

Accordingly, the scope of the invention should be limited only by the claims appended hereto.

We claim:

1. A chambered spray-application system, said system comprising:

a housing having an inlet and an outlet, said inlet and outlet being positioned on opposite sides of said housing;

a means for supplying a virgin fiber such that said fiber enters and exits said housing via said inlet and outlet, respectively;

a variable pressure gas source;

a reservoir for holding at least one liquid therein;

a bobbin positioned to accept thereon the fiber exiting said housing; and an airbrush having a spray nozzle at one end thereof, said airbrush being located within said housing and being coupled in parallel to said pressure source and said reservoir by a plurality of hoses and being adapted for receiving a liquid from said reservoir and spraying the received liquid onto the fiber in response to pressurized gas input from said source to accomplish the coating of the fiber with liquid as the fiber travels through said housing toward said bobbin.

2. A spray-application system as set forth in claim 1, wherein said system further comprises a top exhaust means and a bottom exhaust means, said exhaust means being located at opposite ends, respectively, of said housing for collecting and disposing superfluous liquid.

3. A spray-application system as set forth in claim 2, wherein said hoses comprise a liquid hose and said reservoir comprises a cup having a first valve and a second valve, said cup being coupled to said liquid hose; a first tank for holding therein a first liquid, said first tank being coupled to said first valve; a second tank for holding therein a second liquid, said second tank being coupled to said second valve and a means for controlling the motion of said valves.

4. A spray-application system as set forth in claim 3, wherein said hoses further comprised gas hose and said variable pressure source comprises a supply of a high pressure gas and a regulating means coupled between said supply and said gas hose to regulate the pressure of gas flowing from said supply to said airbrush, through said gas hose.

5. A chambered spray-application system, said system comprising:
   a housing having an inlet and an outlet, said inlet and outlet being positioned on opposite sides of said housing;
   a means for supplying virgin fiber such that said fiber enters and exits said housing via said inlet and outlet, respectively;
   a source of high pressure gas;
   a reservoir for holding therein at least one liquid;
   an airbrush having a spray nozzle at one end thereof, said airbrush being located within said housing and being coupled in parallel to said source and said reservoir by a gas hose and a liquid hose, respectively, and being adapted for receiving a liquid from said reservoir and spraying the received liquid onto said fiber in response to gas input from said source; an electropneumatic controller adapted for issuing controlling signals; and a variable regulator, said regulator being suitably coupled in parallel to said source and said electropneumatic controller to receive gas from said source, regulate the pressure thereof in response to the signals transmitted from said controller and forward the gas to said airbrush.

6. A spray-application system as set forth in claim 5, wherein said system further comprises a cut-off valve, said valve being located in said gas hose for intermittently allowing gas to flow from said regulator through said gas hose to said airbrush.

7. A system for applying a liquid onto a continuously moving fiber, said system comprising:
   an applicator having an inlet hole and an outlet hole on opposite sides thereof;
   a spool arranged to contain a supply of virgin fiber, said spool being positioned to allow said fiber to enter and exit said applicator via said inlet and outlet holes, respectively;
   a reservoir holding therein at least one liquid;
   a sprayer located within said applicator and connected to said reservoir, said sprayer being adapted for receiving a liquid from said reservoir and spraying said liquid onto said fiber;
   at least one exhaust means, said exhaust means being located within said applicator and aligned with said sprayer and said fiber for collecting and disposing superfluous liquid;
   a bobbin mounted to receive the sprayed fiber from said applicator through said outlet hole and wind the fiber in a pre-determined manner; and
   a means for activating said sprayer.

8. A system for applying a liquid onto a continuously moving fiber, said system comprising:
   an applicator having an inlet hole and an outlet hole on opposite sides thereof;
   a spool arranged to contain a supply of virgin fiber, said spool being positioned to allow said fiber to enter and exit said applicator via said inlet and outlet holes, respectively; a reservoir holding therein at least one liquid;
   a sprayer located within said applicator and connected to said reservoir, said sprayer being adapted for receiving a liquid from said reservoir and spraying said received liquid onto said fiber;
   at least one exhaust means being located within said applicator for collecting and disposing superfluous liquid; a bobbin mounted to receive the sprayed fiber from said applicator through said outlet hole and wind the fiber in a predetermined manner;
   a tachometer coupled to said bobbin and adapted to provide indication of the rotation speed of said bobbin;
   a computer coupled to said tachometer to accept the indication from said tachometer and generate output signals in response thereto;
   a source of high pressure gas;
   a valve coupled between said sprayer and said computer to open selectively in response to the signals received from said computer; and,
   a variable regulator coupled between said source and said valve to receive the gas from said source, control the pressure of the gas and transmit the gas to said valve.

* * * * *